United States Patent [19]

Freiberger et al.

[11] Patent Number: 5,393,225

[45] Date of Patent: Feb. 28, 1995

[54] ROTATING TUBE HEAT TREATMENT INSTALLATION, IN PARTICULAR ROTATING TUBULAR KILN, WITH INDIRECT HEAT FEED OR DISSIPATION

[75] Inventors: Norbert Freiberger; Wolfgang Glaser, both of Graz; Bernd Wolschner, Vöcklabruck; Stefan Zikeli, Regau, all of Austria

[73] Assignees: Austrian Energy & Environment SGP/Waagner Biro GmbH, Vienna; Lenzing Aktiengesellschaft, Lenzing, both of Austria

[21] Appl. No.: 87,721

[22] PCT Filed: Dec. 18, 1991

[86] PCT No.: PCT/AT91/00133

§ 371 Date: Jul. 7, 1993

§ 102(e) Date: Jul. 7, 1993

[87] PCT Pub. No.: WO92/12391

PCT Pub. Date: Jul. 23, 1992

[30] Foreign Application Priority Data

Jan. 14, 1991 [AT] Austria ..................... 55/91

[51] Int. Cl.⁶ ............................................ F27B 7/00
[52] U.S. Cl. ................................. 432/103; 432/107; 432/114

[58] Field of Search ............... 432/103, 105, 109, 107, 432/114

[56] References Cited

U.S. PATENT DOCUMENTS 4,612,711  9/1986  Murray ............................... 432/114
4,988,289  1/1991  Coucher ............................. 432/107

*Primary Examiner*—Henry C. Yuen
*Attorney, Agent, or Firm*—Steinberg, Raskin & Davidson

[57] ABSTRACT

A rotating tube heat treatment installation, for example a rotating tubular kiln for the thermal splitting of $MgSO_3$, or a slag cooler for the separation of salts and aluminum, comprises as the main replaceable component, a rotating tube (1) which is surrounded by a tubular jacket (2) and separated therefrom by a gap. The tubular jacket (2) is linked to the rotating tube (1) by means of a carrier system, and has drive (8) and possible bearing races and bandings (9) mounted externally. The connections (3, 4) for the heat exchange fluid are disposed at its ends, and thermal insulation, in particular light insulation (7), is fitted internally. In this way the rotating tube, which is exposed to corrosion and thermal stresses, is simplified structurally and can be readily replaced.

4 Claims, 1 Drawing Sheet

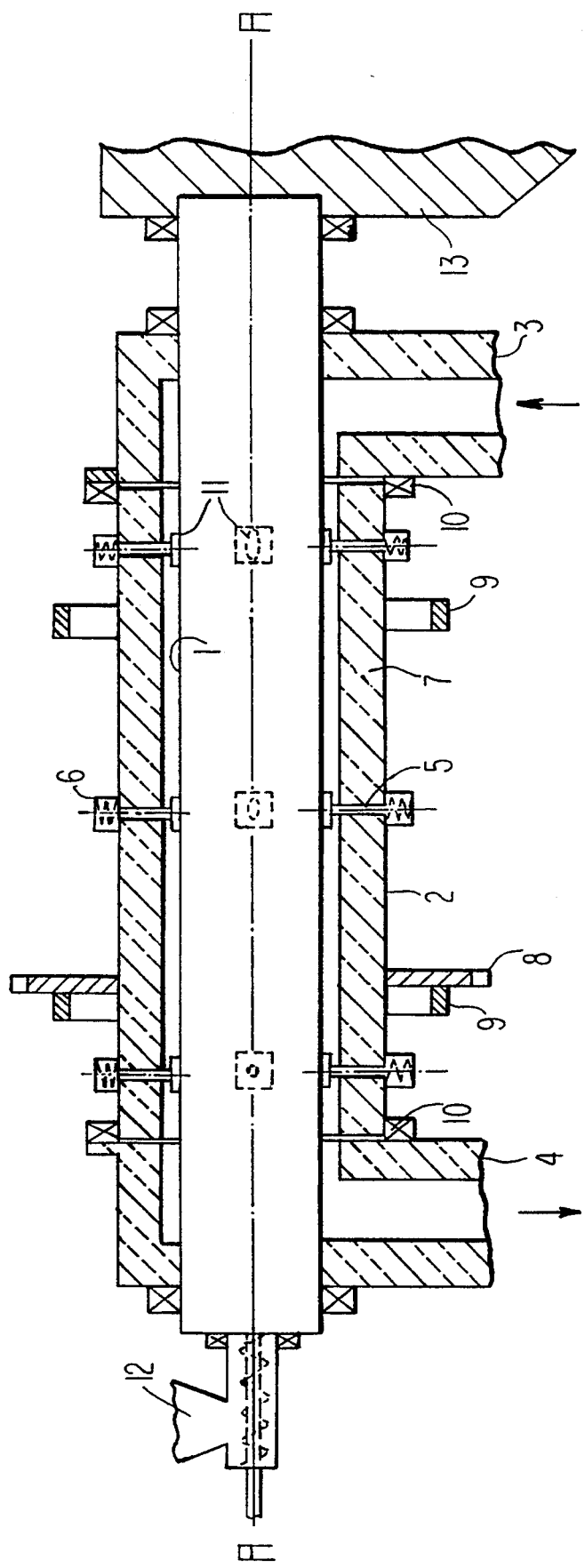

ROTATING TUBE HEAT TREATMENT INSTALLATION, IN PARTICULAR ROTATING TUBULAR KILN, WITH INDIRECT HEAT FEED OR DISSIPATION

The invention relates to a rotating tube heat treatment installation, in particular rotating tubular kiln, with indirect heat feed or dissipation for the thermal treatment of bulk goods or slags, preferably for the splitting of $MgSO_3$ into MgO and $SO_2$, in which a rotating tube and a coaxial tubular jacket connected with it so as to be torsion-resistant and provided with an insulation is held in at least two bearings and the tubular jacket carries at its outside the drive as well as potential bearing races and bandings as well as being connected at its ends through a sealing structure with stationary connections for the heat exchange fluid.

Treatment installations of this type are known from DE-A1 37 41 112, PCT-WO 84/00604, DE-C1 36 32 548 and DE-C3 24 33 676. They have, however, the disadvantage that the rotating tube forms with the tubular jacket a structural part which at its inside is chemically attacked by the medium to be treated and thereby, due to the high temperatures, has a low creep rupture strength so that the structural part as a whole must be viewed as a wearing part. In the case of the known constructions the machine devices such as bearing races, drive crowns, etc. are fastened directly on the rotating tube so that practically the entire installations must be viewed as a wearing part and the total construction costs involve the rotatable kiln part.

The invention is based on the task of freeing the rotating tube as a wearing part of all unnecessary details and to assign them to a jacketlike separate second structural part which does not come into contact with the medium being treated in the rotating tube and, consequently, is not subject to chemical corrosion.

The invention is characterized thereby that the jacket tube is connected with the rotating tube through a detachable carrier system in the form of radial resiliently supported pins, in particular ceramic pins, which permit a heat-elastic relative motion of the jacket tube and the rotating tube in the direction of the line of action of the springs. In particular, the jacket tube has at its inside a heat insulation known per se, such as for example light insulation, and the connections for the heat exchange fluid are preferably implemented dividable in the horizontal direction. In advantageous manner the pins are implemented as an intermediate support of the rotating tube.

An essential application purpose of the treatment installation according to the invention is seen in the splitting of the magnesium monosulfite, which takes place at approximately 800° C. wherein in the medium flowing through the rotating tube is comprised approximately 20% $SO_2$ and, consequently, is highly corrosive.

A further application is found in the cooling of aluminum slag wherein the slag results practically burning and the combustion through lack of oxygen and simultaneous cooling is stopped as quickly as possible so that the granulate forming still comprises aluminum which can be recovered. In this case corrosive vapors are generated also, in particular through the addition of salt in the aluminum melting process, which vapors, together with the liquid aluminum, corrosively stress the inside of the rotating tube so that here also a replacement of the rotating tube must be considered within the operating life of the installation.

The invention is represented in the enclosed FIGURE by example and schematically.

The FIGURE depicts an indirectly heated kiln system with a rotatable inner tube 1, into which the bulk good to be treated is fed in the absence of air via the input device 12 and via the rotary motion of the rotating tube 1 of a further treatment device 13, wherein in the case of the magnesium sulfite splitting in the treatment device 13 a separation takes place into $SO_2$ and MgO, and a jacket tube 2 connected therewith. The essentially straight rotating tube 1 has at its outside welded-on sheets with grooves 11 which pins 5 supported on springs 6 engage which are disposed radially and in the rotatable jacket tube 2 at which are supported the drive 8 of the rotating tubular kiln installation and also potential bandings 9. The pins 5 not only function as carriers for the rotating tube 1 but also support the rotating tube and support it on the relatively cold jacket tube 2 so that the rotating tube 1 has a lesser deflection and is therefore implemented with lesser wall thickness. In the final analysis this means a decrease of the construction weight and also an improvement of the heat transmission. The rotatable structural parts (inner tube 1 and jacket tube 2) are supported in stationary connections 3 and 4 through which the heat-exchange fluid, heating gas or cooling water is supplied to or carried away from the space between the rotating tube 1 and the jacket tube 2. Between the jacket tube 2 and a stationary connection are provided sealing structures 10 which prevent the penetration of heat-exchange fluid and the entry of air. To avoid heat losses the jacket tube is covered with a heat insulation, in particular on its inside with an elastic temperature-stable light insulation 7. To facilitate the replacement of the rotating tube 1 the connections 3 and 4 are disposed in a plane in which is also disposed the axis of rotation A—A of the rotating tube, and implemented so as to be dividable so that after removal of the cover the defective rotating tube 1 can be readily slipped off and replaced by a new, essentially smooth rotating tube. Thereby that the rotating tube 1 is supported through the pins 5 at shorter distances, it can be implemented with lesser wall thickness whereby the total weight of the installation and also the drive power are reduced. The jacket tube 2 relative to the rotating tube 1 has a greater section modulus {and is on} and due to its inner insulation and external cooling through the ambient air is also less thermally stressed so that the introduction of the force through the pins 5, generated by the bearing force of the rotating tube 1 effects practically no increase of the construction weight.

We claim:

1. A rotary tubular heat treatment installation, comprising:
    an outer rotatably mounted jacket tube;
    an inner rotary tube situated within said outer jacket tube substantially coaxial therewith, said inner rotary tube having an outer surface in which grooves are formed, said grooves extending in a longitudinal direction relative to said outer jacket and inlet rotary tubes;
    means for connecting said inner rotary and outer jacket tubes to each other for rotation with each other, said connecting means comprising a plurality of pins spaced around the entire circumference of said outer jacket tube, each of said pins being resiliently mounted in a radial direction and extending between said inner rotary and outer jacket tubes, each of said pins engaging said inner rotary tube to radially support said inner rotary tube within said outer jacket tube, an inner engagement portion of each of said pins being receivable in a respective one of said grooves to enable relative displacement between said outer jacket tube and said inner rotary tube in said longitudinal direction; stationary heat exchange medium inlet and outlet connections fixedly mounted on respective longitudinal ends of said outer jacket tube, said inlet and outlet connections being removable from said outer jacket tube in a longitudinal direction relative to said outer jacket and inner rotary tubes, and means for rotating said outer jacket tube.

2. A rotary tubular heat treatment installation as set forth in claim 1 wherein said inner rotary tube comprises a disposable member, and wherein said outer jacket tube includes an inner surface and further including thermal insulation means provided on said inner surface of said outer jacket tube.

3. A rotary tubular heat treatment installation as set forth in claim 1 wherein said inner rotary tube has ends supported in respective rotary bearings, and said outer jacket tube having ends supported in respective rotary bearings.

4. A rotary tubular heat treatment installation as set forth in claim 1 further including spring means associated with said pins for providing resilient resistance to relative radial displacement between said inner rotary and outer jacket tubes.

* * * * *